(No Model.)

W. P. HARDING.
PRINTER'S CHASE.

No. 449,851.  Patented Apr. 7, 1891.

Witnesses

William P. Harding
Inventor

W. T. Dennis, Attorney
By Chas. Stockman
Ass. Atty.

UNITED STATES PATENT OFFICE.

WILLIAM P. HARDING, OF CAMBRIDGE CITY, INDIANA.

PRINTER'S CHASE.

SPECIFICATION forming part of Letters Patent No. 449,851, dated April 7, 1891.

Application filed April 23, 1890. Serial No. 349,197. (No model.)

*To all whom it may concern:*

Be it known that I, WILLIAM P. HARDING, a citizen of the United States, residing at Cambridge City, in county of Wayne and State of Indiana, have invented certain new and useful Improvements in Printers' Chases or Page-Holders; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of chases or metallic frames used by printers to inclose and confine matter that is in type in the form of pages or otherwise, and which are so constructed as to be capable of being increased or diminished in size.

My invention consists in a certain novel construction of printer's chase of the character specified, substantially as hereinafter described, and particularly pointed out in the subjoined claim.

Figure 1:
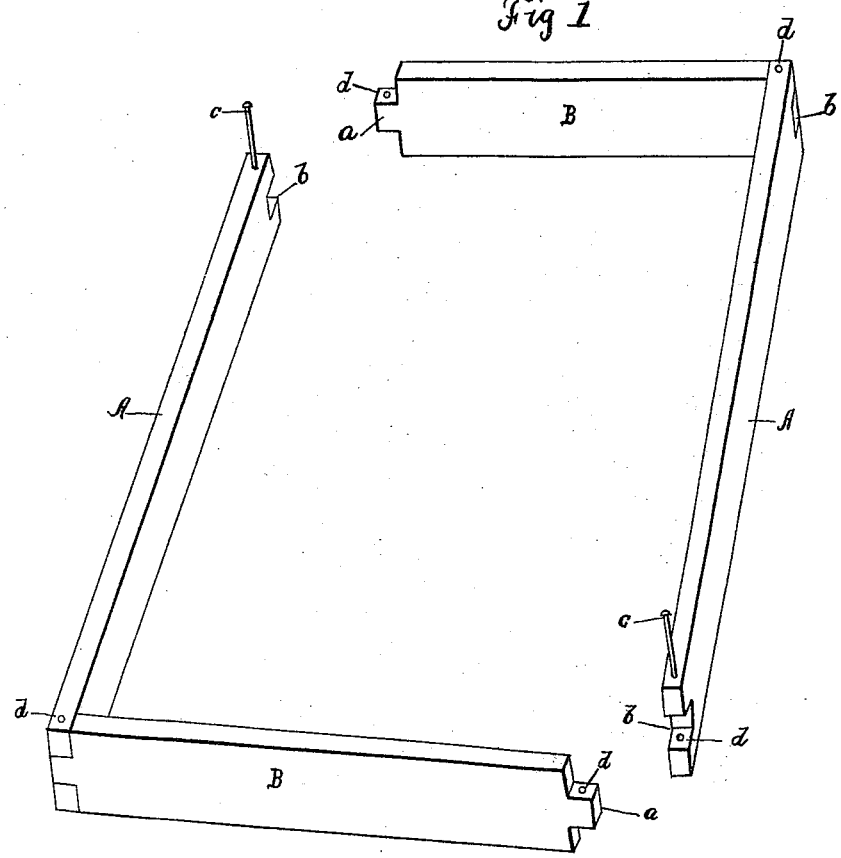
Figure 2:
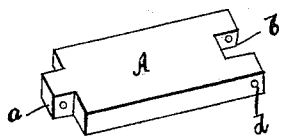
Figure 3:
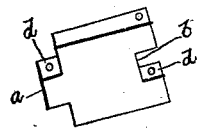

In the drawings, Figure 1 is a perspective view of my improved chase, open at the corners and showing the manner of connecting and securing the same. Fig. 2 is a perspective view of a section. Fig. 3 is a front elevation of the same, partially in perspective.

In Fig. 1, A A represent the side bars or sections of the chase provided with a tenon and shoulders at one end, a corresponding recess and shoulders at the opposite end, while B B represent the end bars or sections of the chase constructed in a similar manner. The supplemental sections are in the same form and are interchangeable in the extension of the size in length or width of the chase, being equally eligible for extending the length or forming the corner. $a\ a$ are the tenons; $b\ b$, the recesses to receive the tenons; $d\ d$, the holes in tenons and shoulders to receive the pins $c\ c$, which hold the joints so formed in place.

Having thus fully described my said invention, what I claim as new, and desire to secure by Letters Patent, is—

A printer's chase constructed in sections and comprising the main longitudinal and transverse sections having recesses and tenons received thereby, removable and interchangeable sections, also having recesses and tenons, and locking-pins passing through the ends of said sections and securing the same together.

In testimony whereof I affix my signature in presence of two witnesses.

WILLIAM P. HARDING.

Witnesses:
 WM. T. DENNIS,
 AMOS K. SHUTE.